(12) United States Patent
Ianev et al.

(10) Patent No.: US 8,208,426 B2
(45) Date of Patent: Jun. 26, 2012

(54) MOBILE TELECOMMUNICATIONS AND RANDOM ACCESS PREAMBLE CONTENT

(75) Inventors: Iskren Ianev, Tokyo (JP); Ajay Vachhani, Tokyo (JP); Stuart Findlay, Tokyo (JP)

(73) Assignee: NEC Corporation, Tokyo (JP)

( * ) Notice: Subject to any disclaimer, the term of this patent is extended or adjusted under 35 U.S.C. 154(b) by 289 days.

(21) Appl. No.: 12/448,772

(22) PCT Filed: Dec. 12, 2007

(86) PCT No.: PCT/JP2007/074366
§ 371 (c)(1),
(2), (4) Date: Oct. 21, 2009

(87) PCT Pub. No.: WO2008/084633
PCT Pub. Date: Jul. 17, 2008

(65) Prior Publication Data
US 2010/0091704 A1     Apr. 15, 2010

(30) Foreign Application Priority Data
Jan. 8, 2007 (GB) .................................. 0700264.5

(51) Int. Cl.
*H04B 7/212* (2006.01)
(52) U.S. Cl. .......................... 370/328; 370/476
(58) Field of Classification Search .......... 370/328–338, 370/312, 315–327, 468–473, 476
See application file for complete search history.

(56) References Cited

U.S. PATENT DOCUMENTS
2003/0174672 A1   9/2003   Herrmann
2007/0147326 A1*  6/2007   Chen .............................. 370/338
2009/0252125 A1* 10/2009   Vujcic .......................... 370/336

FOREIGN PATENT DOCUMENTS
JP    2004-529548    9/2004
JP    2006-319757   11/2006

OTHER PUBLICATIONS

Phillips, 3GPP TSG-RAN WG2 Meetting#55, Content of Unsynchronised RACH Preamble Message, R2-062937, Oct. 2006.*
3GPP TSG RAN1#46bis, R1-062976 Reply to RAN2 LS on Random-Access Related Issues, Seoul, Oct. 9-13, 2006.
3GPP TSG RAN2#55, R2-062952 Content of Non Synchronized Random Access Message by Motorola, Oct. 9-13, 2006.
3GPP TSG RAN2#54, R2-062107, Content of initial unsynchronized RACH access and contention resolution by TI, Tallinn, Aug. 28-Sep. 1, 2006.
3GPP TSG RAN2#55, R2-062937, Content of Unsynchronized RACH Preamble Message by Philips, Seoul, Oct. 9-13, 2006.
3GPP TSG RAN2#55, R2-062822, Information of the random access preambles by Samsung, Seoul, Oct. 9-13, 2006.
3GPP TSG RAN2#55, R2-062995, Initial Access Procedure in LTE by NTT Do Como, Seoul, Oct. 9-13, 2006.

* cited by examiner

*Primary Examiner* — Pao Sinkantarakorn
*Assistant Examiner* — Iqbal Zaidi
(74) *Attorney, Agent, or Firm* — McGinn IP Law Group, PLLC

(57) ABSTRACT

The present invention provides for a mobile radio communications device of a mobile radio communications network arranged for delivering a non-synchronized random access preamble message such that the non-synchronized random access preamble message comprises a multi-bit message including Cause ID bits and selective bits comprising at least signature bits for collision avoidance, and in which the inclusion of CQI bits is determined responsive to signaling received from the network and indicative of cell characteristics or parameters.

9 Claims, 3 Drawing Sheets

MOBILE TELECOMMUNICATIONS AND RANDOM ACCESS PREAMBLE CONTENT

Figure 1:
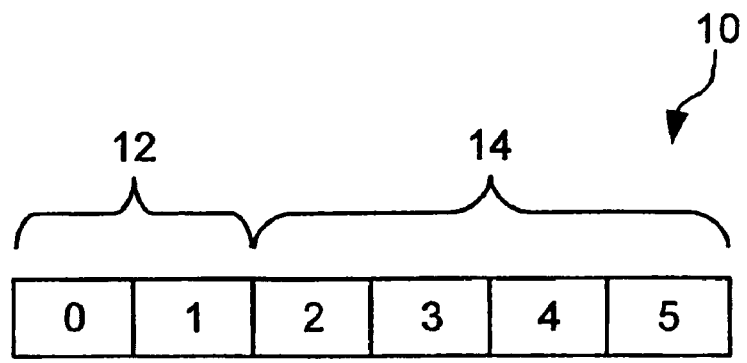

The present invention relates to the field of mobile telecommunications and in particular, to a mobile radio communications device, and related network and network element, arranged for controlling the non-synchronized random access preamble content and also to the said content of the non-synchronized random access preamble.

In discussions relating to Evolved Universal Telecommunications Radio Access Network (E-UTRAN) systems, Radio Access Network (RAN) working groups established under the Third Generation Partnership Project (3GPP) have focussed upon non-synchronized Random Access (RA) preamble content.

Various proposals by such working groups have been made available such as:

3GPP TSG RAN1#46bis, R1-062976 Reply to RAN2 LS on Random-Access Related Issues, Seoul, 9-13 Oct. 2006;

3GPP TSG RAN2#55, R2-062952 Content of Non Synchronized Random Access Message by Motorola, 9-13 Oct. 2006;

3GPP TSG RAN2#54, R2-062107, Content of initial unsynchronized RACH access and contention resolution by TI, Tallinn, 28 Aug.-1 Sep. 2006;

3GPP TSG RAN2#55, R2-062937, Content of Unsynchronized RACH Preamble Message by Philips, Seoul, 9-13 Oct. 2006;

3GPP TSG RAN2#55, R2-062822, Information of the random access preambles by Samsung, Seoul, 9-13 Oct. 2006; and 3GPP TSG RAN2#55, R2-062995, Initial Access Procedure in LTE by NTT Do Como, Seoul, 9-13 Oct. 2006.

However, as yet there have been no definitive suggestions nor disclosures concerning the exact association between the payload and the preamble.

Common ground for agreement currently generally relates to the implicit transmission of the RA preamble payload by way of preamble selection. Also, the appropriate size of the RA preamble is considered to be 6 bits.

However, the present invention recognizes that disadvantageous limitations exists with regard to the non-synchronized RA preamble content since it is found to be restrictive and lacking in any useful selective flexibility.

The present invention seeks to provide for a non-synchronized RA preamble content structure having advantages over known such structures and also to mobile radio communication devices, related networks and related network elements arranged for employing such non-synchronized RA preamble content and wherein such devices, networks and elements exhibit advantages over known such devices, networks and elements.

According to a first aspect of the present invention there is provided a mobile radio communications device for use in a mobile radio communications network and arranged for delivering a non-synchronized random access preamble, wherein the non-synchronized random access preamble has a multi-bit structure including Cause ID bits and selective bits, the said selective bits including at least Random ID bits for collision avoidance.

The mobile radio communications device of the present invention is therefore advantageous insofar as it can generate non-synchronized random access preamble content having an appropriate degree of flexibility that is not found within the current art.

Such flexibility proves particularly advantageous insofar as the random access preamble can then be readily employed, in a responsive manner, having regard to different cell parameters and characteristics such as differing loads, latency requirements and evolved e-Node (eNB) locations.

Thus, and as will be described further below, the mobile radio communications network employing such a device can advantageously deploy different random access preamble schemes dependent upon, for example, latency constraints expected loading within the network cells and eNB locations.

The flexibility absent from the current art is therefore advantageously achieved.

Preferably, the said selective bits can include Channel Quality Indication (CQI) bits. In particular, the CQI bits share the same portion of the preamble as the signature bits.

As will be appreciated, the aforesaid signature bits can comprise Random ID bits which, as noted, advantageously provide for collision avoidance.

In accordance with one particularly advantageous aspect of the present invention, the mobile radio communications device can be arranged to vary the composition of the said selective bits responsive to signaling received from the network.

Preferably, the said instructions are received by way of System Information Block (SIB) messaging.

In particular, the instructions can comprise a channel quality preamble flag which, for example, can comprise a 2-bit flag.

According to another aspect of the present invention there is provided a network element arranged for transmission of instructions to a mobile radio communications device within a mobile radio communications network, the said instructions serving to determine the composition of selective bits within multi-bit non-synchronized random access preamble content comprising Cause ID bits and said selective bits, the said selective bits further comprising at least signature bits for collision avoidance.

As above, advantageous flexibility can be introduced into the composition of the non-synchronized random access preamble message through the use of such a network element.

Also, the selective bits can include CQI bits which along with the Random ID bits become part of signature.

In particular, the network element can be arranged to send the said instructions within SIB messaging and the said instructions can comprise a preamble quality indicator flag which can consist of a 2-bit flag.

Advantageously, the instructions are sent responsive to cell parameters such as one or more of traffic load, latency requirements and network element location.

As will be appreciated, in one particular embodiment, the network element can comprise an e-NB element.

The network element can then advantageously be arranged to receive a subsequent non-synchronized random access preamble message for the decoding thereof.

In such an arrangement, the network element can include a timer for the timed control of the said decoding.

According to yet another aspect of the present invention there is provided a method of determining the composition of a multi-bit random access preamble content in a mobile radio communications device, the non-synchronized random access preamble message comprising Cause ID bits and selective bits and the said selective bits comprising at least signature bits for collision avoidance, and the method including the step of selecting the said selective bits in response to instructions received at the mobile radio communications device.

As above, the said selective bits (signature) can advantageously comprise CQI bits.

The method can include the step of receiving the said instructions by way of SIB messaging in which instructions can again comprise a preamble channel quality flag which, in one example, comprises a 2-bit flag.

The instructions to which the selection of the selective bits is responsive can advantageously be determined by cell parameters such as at least one of traffic load, latency requirements and, for example, eNB location.

According to a further aspect of the present invention there is provided non-synchronized random access preamble such as to be delivered from a mobile radio communications device operating within a mobile radio communications network, the random access preamble comprising multi-bit content including Cause ID bits and selective bits, the said selective bits including at least signature bits for collision avoidance.

Preferably, the said selective bits are arranged to be selected so as to include CQI bits.

Further, the said signature bits can comprise Random ID bits. In one particular embodiment, the non-synchronized random access preamble message comprises a 6-bit message in which 2-bits comprise the said Cause ID bits.

Within such a message, 4-bits can comprise selective bits in which at least 2-bits can be selected to comprise CQI bits.

According to still a further aspect of the present invention there is provided a method of controlling content of non-synchronized random access preamble from a mobile radio communications device within a mobile radio communications network, the method including the step of determining composition of the preamble and which comprises Cause ID bits and selective bits including at least signature bits for collision avoidance, the method further including delivering instructions from the network to the mobile radio communications device for selection of the said selective bits.

As with the method defined above, the said selective bits can include CQI bits and the signature bits can comprise Random ID bits.

Further, the network can be arranged to deliver the said instructions within SIB signaling and which instructions can comprise a preamble channel quality flag which, in one embodiment comprises a simple 2-bit flag.

The nature of the instructions delivered from the network is advantageously determined by cell parameters such as at least as one of a traffic load, latency requirements and, for example, eNB location.

The present invention can advantageously introduce the required flexibility into the non-synchronized random access preamble content by proposing differing schemes for the preamble content, which differing schemes can be tailored to suit specific locations and specific traffic and latency constraints.

While the illustrated embodiment discussed further below indicates four such different schemes, it should be appreciated that the present invention is not so limited.

Figure 2A:
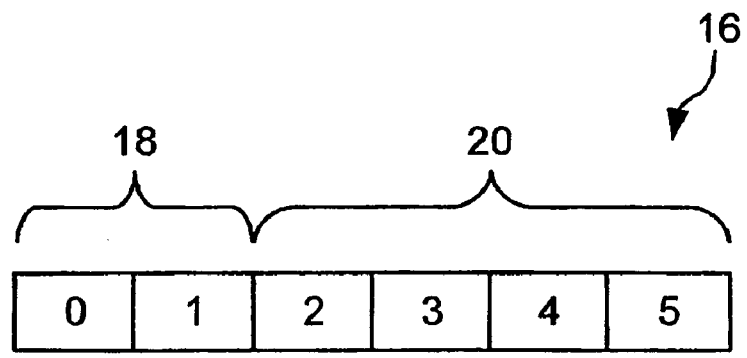
Figure 2B:
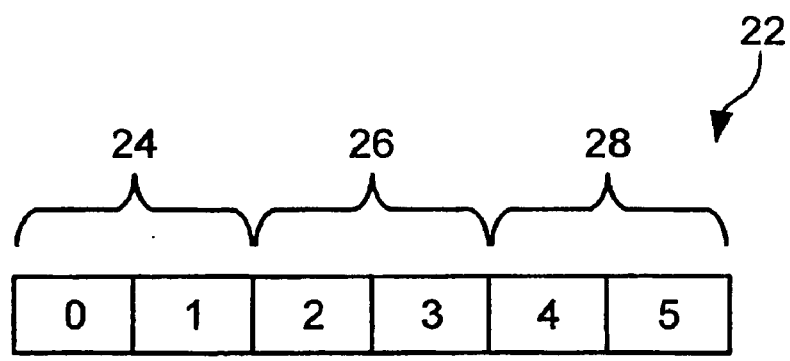
Figure 3:
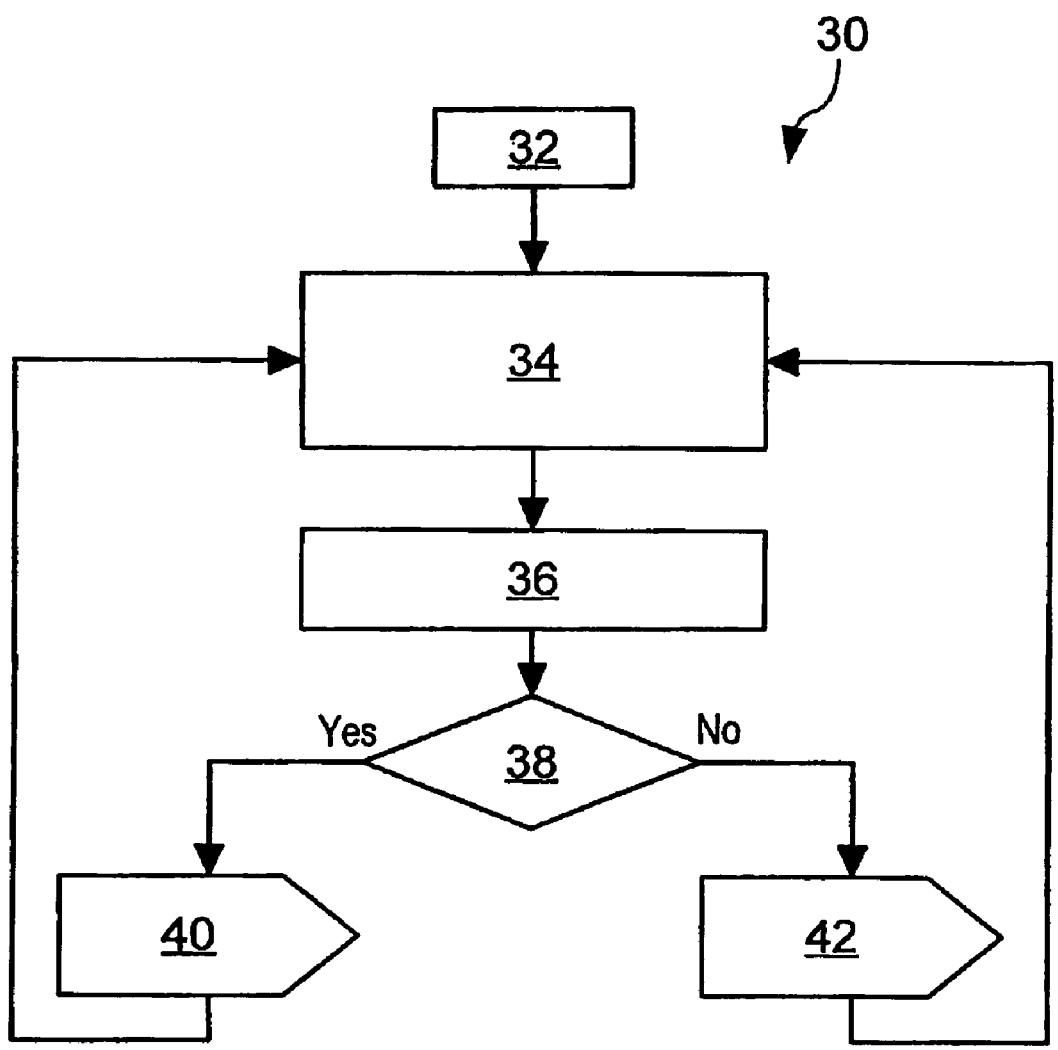
Figure 4:
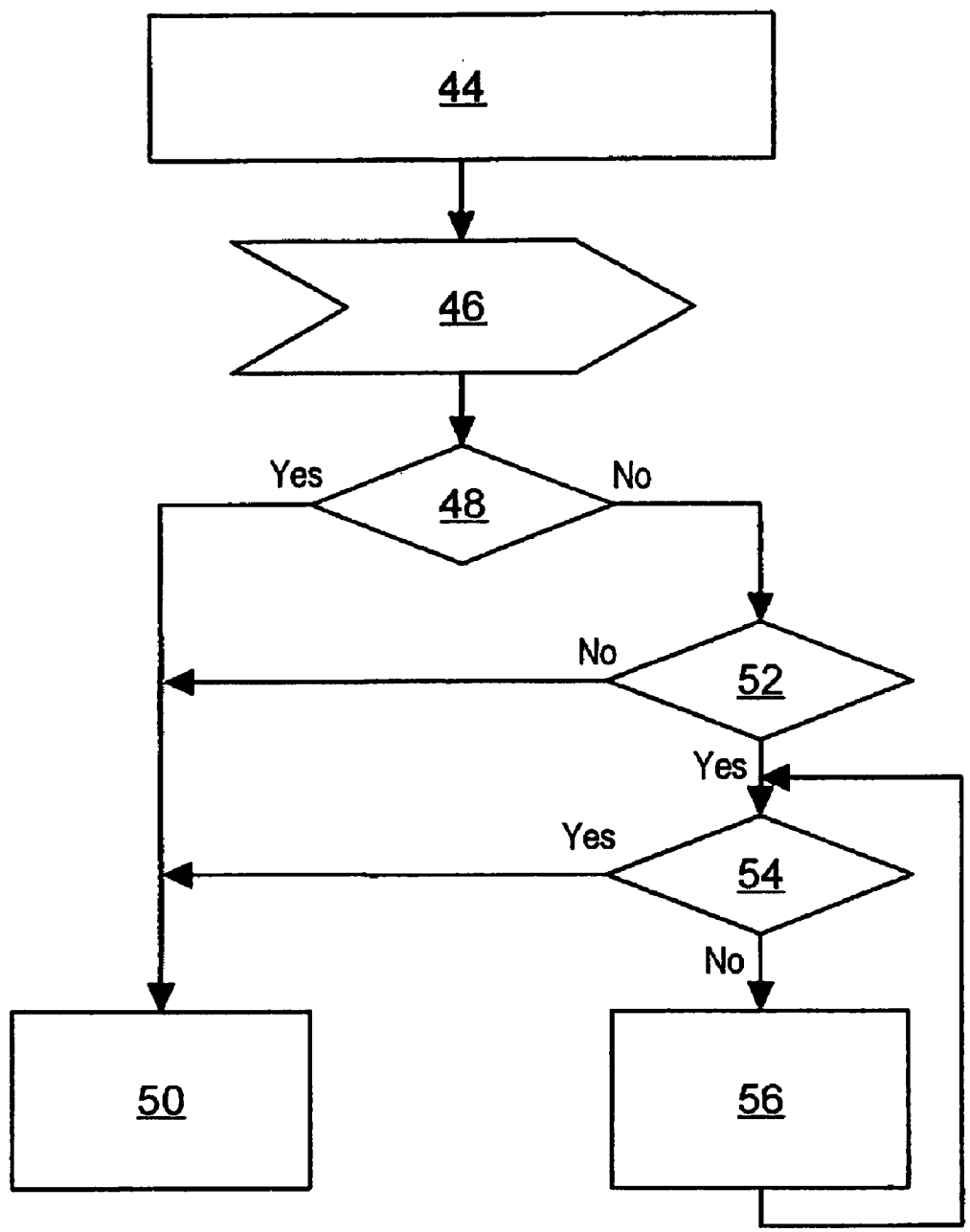

The invention is described further hereinafter, by way of example only, with reference to the accompanying drawings in which:

FIG. 1 indicates a 6-bit non-synchronized random access preamble content according to an embodiment of the present invention;

FIGS. 2*a* and 2*b* illustrate variations on the preamble content having regard to four different CQI inclusion schemes according to an embodiment of the present invention;

FIG. 3 is a flow diagram illustrating operation within a mobile radio communications device according to an embodiment of the present invention; and FIG. 4 is a flow diagram illustrating operation of a network element according to an embodiment of the present invention.

As mentioned above, the content of non-synchronized random access preamble messaging has been the subject of a variety of RAN working group discussions which, to date, have generally led to agreement as to the transmission of the RA preamble, use of a mandatory signature field (Random ID) for collision avoidance and with the size of the preamble being set at a 6-bits.

As will be appreciated from the following, the present invention relates to the additional use of Cause ID and CQI fields within the RA preamble.

The Cause ID field can be included so as to allow for an eNB to assign the uplink resources in an efficient manner and to reduce latency. This advantageously allows for a one-step random access procedure.

While the requirement for a Cause ID field has been identified, there has been no discussion by 3GPP as to the range and priority of the Cause ID that might be employed.

Channel Quality Indication (CQI) is generally required to assist with downlink power control. For example, if the eNB does not contain any CQI information, a fixed downlink power level is applied which serves to ensure in the order of 95% coverage.

While the use of three such fields is considered potentially important, and that they should all ideally be present within the non-synchronized random access preamble, the exact nature of the association between the payload and the preamble has not been decided by 3GPP yet.

In any case, and as noted above, the known preamble content suffers one particular disadvantage in that, in view of its inflexibility, it cannot prove responsive to different eNB locations and to changes in cell parameters/characteristics such as differing load situations, and latency requirements.

An embodiment of the present invention is discussed further below with reference to the accompanying drawings and, as will be illustrated, supports the use of Cause ID within the preamble. The illustrated embodiment of the present invention that follows relates to four different schemes for handover, initial access, scheduling requests and uplink synchronization requirements.

As a particularly important aspect of the present invention, 4-bits of the for example 6-bit preamble can be combined and employed for the above mentioned Random ID bits and the CQI bits, forming the Signature part of the RA preamble.

Such a structure is illustrated in FIG. 1 in which a non-synchronized RA preamble 10 is illustrated in which the first 2-bits comprise Cause ID bits 12, and the remaining 4-bits are available for selective bits which can comprise a combination of CQI and signature bits 14.

As will be discussed below particularly in relation to FIGS. 2*a* and 2*b*, the composition of the 6-bit preamble, and in particular the CQI and signature portion 14 can be selectively determined on the basis of signaling received at a mobile radio communications device within the network. The structure can be varied so as to vary the appropriate CQI included in the preamble having regard to cell characteristics such as latency constrains and expected load.

The illustrated embodiment discussed further below suggests the use of four different CQI inclusion schemes and the signaling instructions from the network can be delivered by way of a 2-bit flag comprising a CQR (CQI in Random access preamble) flag. The 2-bit CQR flag is advantageously broadcast within the SIB messaging and, as noted, serves to instruct the mobile radio communications device as to which CQI inclusion scheme to apply by way of the CQI and signature fields 14.

Turning now to FIGS. 2a and 2b there are illustrated the different compositions of the non-synchronized RA preamble message 16, 22 according to different operational schemes of the present invention.

Within FIG. 2a, and as with FIG. 1, the RA preamble 16 comprises a 2-bit Cause ID field 18 and a selective field comprising solely a 4-bit signature (Random ID) field 20. Thus, in FIG. 2A, there are no CQI field bits within the selective field.

With regard to FIG. 2b, there is again illustrated a 2-bit Cause ID field 24, but, on this occasion, the 4-bits signature now comprises two CQI bits 26 and two Random ID bits 28.

The above mentioned change in structure as illustrated by reference to FIGS. 2a and 2b arises in relation to the four above mentioned CQI inclusion schemes as is now discussed in greater detail below, and which relate in turn to Handover, Initial Access, Scheduling Request and Uplink Synchronization schemes.

Within CQI a first inclusion scheme a 2-bit CQR flag is employed in which CQR flag=00. Here there are no CQI bits for Handover type RA preamble as illustrated by FIG. 2a, and 2 CQI bits for the other types of RA preambles as illustrated in FIG. 2b. This leaves sixteen signatures (2 to the power of 4) for the Handover RA preamble and four (2 to the power of 2) to sixteen (2 to the power of 4) signatures (depending on the CQI values) for the other three types of RA preamble providing an average of ten signatures per RA preamble type. Such a scheme could find use in situations of high Handover RAs and high level of Handover type RA collisions. This would decrease the collision probability for Handover type RAs by up to four times and could for example, prove particularly beneficial for cells near motorways and other locations where high handover volumes might arise.

For the second, Initial Access, scheme, the CQR flag is set to 01. Here no CQI bits for Initial Access type RA preamble are present again as illustrated in FIG. 2a, and two CQI bits are included for the other types of RA preambles again as in FIG. 2b. This again leaves sixteen signatures for the Initial RA preamble type and four to sixteen signatures (depending on CQI value) for the other three types of RA preambles. As a practical example an eNB could select this scheme for situations of high Initial RAs and high level of Initial Access type collisions. This would decrease the collision probability for Initial Access up to four times and so could prove beneficial for cells close to stadiums, exhibitions and other possibly densely populated locations.

For the Scheduling Request Scheme, the CQR flag can be set at 10. Again referring to FIG. 2a, no CQI bits for the Scheduling Request type RA preamble are found but two CQI bits for the other types of RA preambles are provided as in FIG. 2b. This again leaves sixteen signatures for the Scheduling Request type RA preamble and from four to sixteen signatures (depending on the CQI bits) for the other three types of RA preambles. As an example, an eNB could select this scheme in situations of high Scheduling Request RAs and high level of Scheduling Request type RA collisions. This can decrease the collision probability for Scheduling Requests up to four times.

Finally, and with regard to the fourth scheduling scheme for Uplink Synchronization (Uplink Synch), the CQR flag would be set at 11. No CQI bits for Uplink Synch type RA preamble are provided again as in the structure of FIG. 2a and two CQI bits are provided for the other types of RA preambles as in FIG. 2b. This again leaves sixteen signatures for the Uplink Synch RA preamble and four to sixteen signatures (depending on the CQI values) for the other three types of RA preambles. An eNB is likely to select this final scheduling scheme in situations of high Uplink Synchronization RAs and high level of Uplink sync type RA collisions. Again this can serve to decrease the collision probability for Uplink Synchronization by up to four times.

As noted above, a particular determination of which inclusion scheme is employed is made in the illustrated example on the basis of a 2-bit CQR flag which can be provided within SIB messaging from the network.

Once the CQR flag within the relevant SIB has been received and read, the mobile radio communications device can readily apply the appropriate CQI inclusion scheme as illustrated for example with reference to FIG. 2a and FIG. 2b.

The eNB then has two options of behavior depending upon the CQR flag change. First the CQI bits inclusion for selected RA type changes from OFF to ON (CQIon). In this case the eNB starts a timer (Tcqi) as soon as it sets the new CQR flag and will then start using the new 'CQI inclusion scheme' in the RA preamble decoding at the expiry of the timer. This serves to ensure that eNB decodes the CQI bits in the RA preamble only when the CQI bits are present. The Tcqi timer value is related to how often the UE reads the system information which distributes the CQR flag.

In the second option, CQI bits inclusion on selected RA type changes from ON to OFF, or remains OFF (CQIoff). Here the eNB starts using the new 'CQI inclusion scheme' in RA preamble decoding as soon as it sets the new CQR flag.

Thus, as will be appreciated, the particular illustrated embodiment of the present invention is distinguished from the current art insofar as four subsequent bits can be employed for the signature field within the RA preamble and such that the remaining two bits can then be advantageously employed as the Cause ID field.

Inclusion of the CQI bits within the RA preamble is achieved by selectively including the CQI bits within the selective bits along with the signature bits and which, as appropriate, can achieve the four CQI inclusions schemes discussed above.

Thus, a particularly important aspect of the present invention is that the CQI information can be included within the signature field comprising the four signature bits.

Turning now to FIG. 3, there is provided a flow diagram illustrating operation of an embodiment of the present invention within a mobile radio communications device.

It should be appreciated that the diagram of FIG. 3 relates specifically to the possible adoption of the first above-mentioned CQI inclusion scheme as discussed above, i.e. the possible Handover RA preamble scheme.

The process 30 starts at step 32 with the powering-up of the mobile radio communications device.

At step 34, the device reads the CQR flag as obtained from the relevant system information. For example, if the 2-bit flag comprises 00, the mobile radio communications device is arranged, as noted, to apply the first CQI inclusion scheme within the next non-synchronized RA preamble to be produced.

The processing continues to step 36 where identity of the next non-synchronized RA preamble is determined.

At step 38, it is determined whether or not the RA preamble is a Handover type such as discussed above and, if so, the procedure continues to step 40 where the mobile radio communications device employs the CQI inclusion scheme as illustrated in FIG. 2a with no CQI bits contained in the selective portion of the preamble, nor within the preamble 16 itself.

If, however, at step 38 it is determined that the RA is not a Handover RA preamble, the process continues to step 42 at which the mobile radio communications device is controlled to employ the first CQI inclusions scheme but, as illustrated in FIG. 2b, with 2 bits 26 within the CQI field.

Turning now to FIG. 4, there is again illustrated processing according to an embodiment of the present invention but in this figure in relation to operation at an eNB within the network.

Thus, FIG. 4 relates to the network procedure remote from the mobile radio communications device at a network element and commences at step 44 with selection by an eNB of a CQI inclusion scheme that best suits at least one of traffic load and latency requirements that are likely to be experienced.

As such, the eNB sets the 2-bit CQR flag to 00 within the SIB to be delivered to the mobile radio communications device and, further, starts a timer at value Tcqi.

At step 46, the eNB receives the RA preamble from the mobile radio communications device and at step 48 it is determined whether or not the RA preamble is of Handover type.

If, at step 48, it is identified that the RA preamble is of Handover type, the procedure continues to step 50 where the eNB employs the first CQI inclusion scheme within non-synchronized RA preamble decoding, again with no CQI in the preamble as illustrated in FIG. 2a.

If, however, at step 48 it is determined that the RA preamble is not a Handover preamble, the procedure continues to step 52 where it is determined whether or not the CQI field has changed from OFF to ON.

In no such change has occurred, the procedure then continues to step 50 as noted above.

However, if at step 52 it is determined that a change in CQI field from OFF to ON has occurred, the processing continues to step 54 where it is determined whether or not the previously initiated timer Tcqi has in fact expired.

If the timer has expired, the procedure continues to step 50. If not, the process continues to step 56 and so as to delay employment of the new CQI inclusion scheme until expiry of the timer Tcqi. In order to achieve this, and as will be appreciated, step 56 loops back to step 54 so as to allow for eventual expiry of the timer Tcqi.

It is a particular advantage of the invention that the eNB waits for expiry of the timer Tcqi in order to ensure that the CQI bits are present within the RA preamble.

Efficient and particularly reliable operation of the present invention can therefore be achieved.

It should of course be appreciated that the invention need not be restricted to any of the specific details outlined above. For example, the CQI need not be limited to either 0 or 2 bits as noted and can comprise any appropriate number as required. Further, CQR flag can comprise any appropriate number of bits as based on the Cause ID and so can comprise, as further examples, 1 or 3 bits and regardless of explicit or implicit inclusion of the Cause ID.

As will be appreciated, and with particular regard to the illustrated embodiment of the present invention, the invention can advantageously introduce flexibility within non-synchronized RA preamble content and advantageously allows at least four possible inclusion schemes for the said content so as to advantageously achieve the adaptability notably absent from the current art.

The invention claimed is:

1. A method of determining a composition of a multi-bit non-synchronized random access preamble message in a mobile radio communications device, the non-synchronized random access preamble message comprising Cause ID bits and selective bits, wherein said selective bits comprise at least signature bits for collision avoidance, the method comprising:

selecting said selective bits in response to instructions received at the mobile radio communications device, wherein the instructions indicate four solutions including Channel Quality Indication bits, said selecting comprising:

when the instruction indicates a first solution, a random access of a Handover type does not include the Channel Quality Indication bits, and random access preambles of other types include the Channel Quality Indication bits;

when the instruction indicates a second solution, a random access preamble of an Initial Access typed does not include the Channel Quality Indication bits, and random access preambles of other types include the Channel Quality Indication bits;

when the instruction indicates a third solution, a random access preamble of a Scheduling Request type does not include the Channel Quality Indication bits, and random access preambles of other types include the Channel Quality Indication bits; and when the instruction indicates a fourth solution, a random access preamble of a Uplink Synchronization type does not include the Channel Quality Indication bits, and random access preambles of other types include the Channel Quality Indication bits.

2. The method as claimed in claim 1, wherein said instructions are received within a System Information Block messaging.

3. The method as claimed in claim 1, wherein said instructions comprise a 2-bit preamble channel quality flag.

4. The method as claimed in claim 1, wherein said selective bits further comprise the Channel Quality Indication bits.

5. A method of controlling a content of a non-synchronized random access preamble from a mobile radio communications device within a mobile radio communications network, the method including:

determining a composition of the preamble which comprises Cause ID bits and selective bits including at least signature bits for a collision avoidance; and delivering instructions from the network to the mobile radio communications device for a selection of said selective bits, wherein the instructions indicate four solutions including Channel Quality Indication bits, said selecting comprising:

when the instruction indicates a first solution, a random access preamble of a Handover type does not include the Channel Quality Indication bits, and random access preambles of other types include the Channel Quality Indication bits;

when the instruction indicates a second solution, a random access preamble of a does not include the Channel Quality Indication bits, and random access preambles of other types include the Channel Quality Indication bits; and when the instruction indicates a third solution, a random access preamble of a Scheduling Request type does not include the Channel Quality Indication bits, and random access preambles of other types include the Channel Quality Indication bits; and when the instruction indicates a fourth solution, a random access preamble of a Uplink Synchronization tape does not include the Channel Quality Indication bits, and random access preambles of other types include the Channel Quality Indication bits.

6. The method as claimed in claim 5, wherein the network is arranged to deliver said instructions within a System Information Block signaling.

7. The method as claimed in claim 5, wherein the instruction delivered from the network is determined responsive to cell parameters.

8. The method as claimed in claim 7, wherein said cell parameters comprise at least one of a traffic load, latency requirements, and an evolved e-Node location.

9. The method as claimed in claim 5, wherein said selective bits further comprise the Channel Quality Indication bits.

* * * * *